United States Patent
Chen

[19]

[11] Patent Number: 6,003,038
[45] Date of Patent: Dec. 14, 1999

[54] OBJECT-ORIENTED PROCESSOR ARCHITECTURE AND OPERATING METHOD

[75] Inventor: Tao Shinn Chen, Cupertino, Calif.

[73] Assignee: Sun Microsystems, Inc., Palo Alto, Calif.

[21] Appl. No.: 08/831,442

[22] Filed: Mar. 31, 1997

[51] Int. Cl.$^6$ ............................. G06F 17/00; G06F 17/30
[52] U.S. Cl. ........................ 707/103; 707/100; 712/200; 709/1
[58] Field of Search ..................................... 707/103, 100; 395/704, 705, 707; 712/200; 709/1

[56] References Cited

U.S. PATENT DOCUMENTS

| | | | |
|---|---|---|---|
| 5,446,902 | 8/1995 | Islam ........................................ | 395/700 |
| 5,511,196 | 4/1996 | Shackelford et al. .................. | 395/700 |
| 5,615,362 | 3/1997 | Jensen et al. ............................ | 395/614 |
| 5,632,034 | 5/1997 | O'Farrell ................................. | 395/701 |
| 5,682,532 | 10/1997 | Remington et al. .................... | 395/683 |
| 5,692,193 | 11/1997 | Jagannathan et al. .................. | 395/676 |
| 5,706,506 | 1/1998 | Jensen et al. ............................ | 395/614 |
| 5,736,984 | 4/1998 | Jellinek et al. ......................... | 345/338 |
| 5,740,441 | 4/1998 | Yellin et al. ............................ | 395/704 |
| 5,745,758 | 4/1998 | Shaw et al. .............................. | 395/672 |
| 5,787,431 | 7/1998 | Shaughnessy ........................... | 707/100 |
| 5,797,007 | 8/1998 | Erickson et al. ........................ | 395/683 |
| 5,815,718 | 9/1998 | Tock ........................................ | 395/705 |
| 5,848,423 | 12/1998 | Ebrahim et al. ........................ | 707/206 |

Primary Examiner—Paul V. Kulik
Attorney, Agent, or Firm—Skjerven, Morrill, MacPherson, Franklin & Friel, L.L.P.; Stephen A. Terrile

[57] ABSTRACT

A class structure of an object-oriented program system is optimized for hardware and implemented as a hardware system in an object-oriented processor. For example, a class structure derived from a Java Virtual Machine software system is optimized for hardware and implemented as a hardware Java object-oriented processor. A processor is implemented by defining a data structure and an object-oriented instruction set for executing in the object-oriented operating environment, and generating a hardware implementation of the processor enforcing the logical relationships of the instruction set as defined by the data structure. The data structure includes a class structure. The class structure and the instruction set describe the processor operations. A processor includes an execution engine based on a class structure to execute instructions of an object-oriented instruction set. The instruction set uses pointers for indexing through data structures to define an object method for execution. At the top of the data structure is a class structure for selecting the static class for creating objects. Once the class is found by indexing through the class structure, a constant pool is accessed to supply information to further describe the data structures that are used for creating an object and executing an object method. A processor includes an execution unit and a memory. The memory stores a data structure including a class structure. Classifiers are selected by a program and loaded. The class structure directs the instantiation of the loaded classifiers into objects. The execution unit executes object methods directed by the class structure.

18 Claims, 10 Drawing Sheets

OBJECT-ORIENTED PROCESSOR ARCHITECTURE AND OPERATING METHOD

BACKGROUND OF THE INVENTION

1. Field of the Invention

The present invention relates to processors and computer systems. More specifically, the present invention relates to an object-oriented processor architecture and operating method.

2. Description of the Related Art

A conventional central processing unit (CPU) of a processor functions in a sequential manner, repeatedly fetching and executing instructions in a predefined order. This sequential operation is typical of a von Neumann-architecture computer.

Software technologies have evolved to advantageously employ a concept of object-oriented computing in which program operations are organized as cooperative collections of objects, each representing an instance of some class. The classes are members of a hierarchy of classes that are united by inheritance relationships. In the object-oriented structure, classes are generally viewed as static while objects have a dynamic nature. Object-oriented approaches have led to improved productivity in program production, improved program reliability and reduction of programming errors, and improved performance in complex programs. Object-oriented approaches are universally applied as software constructs such as purely C++ type data structures that are suitable for software execution and implementation at the very high application level.

The conventional CPU does not implement the concept of a data structure or of object-oriented computing. Instead, data structures and object-oriented computing are imposed at a high architectural level such as the operating system level and translated into conventional instructions that are executed by the CPU using conventional sequential execution of primitive instructions.

Object-oriented approaches are currently attained only by high level software operating systems and high level software applications. Accordingly, object-oriented approaches are only available with the activation of a software system disadvantageously incurring software overhead that reduces processor performance.

What is needed is a processor and associated operating method that achieves object-oriented functionality without incurring software overhead and degraded performance.

SUMMARY OF THE INVENTION

Object-oriented computing operates on the basis of static classes that create dynamic objects when the objects are needed and terminating the objects when the objects are idle. The object-oriented processor attains object-oriented computing in a hardware processor by defining data structures and implementing an instruction set based on the defined data structures. In the object-oriented processor, a central processing unit (CPU) executes by creating an object, computing a method inside the created object and during the computation creating additional objects, and jumping to the additional objects. The CPU accordingly moves from object to object, creating new objects when new objects are needed and selectively terminating objects when the objects are no longer executing.

In accordance with an aspect of the present invention, a class structure of an object-oriented program system is optimized for hardware and implemented as a hardware system in an object-oriented processor. In a particular embodiment, a class structure derived from a Java™ Virtual Machine software system is optimized for hardware and implemented as a hardware Java™ object-oriented processor.

In accordance with an aspect of the present invention, the structure and operations of a processor are precisely defined and implemented by defining a data structure of an object-oriented operating environment, defining an object-oriented instruction set for executing in the object-oriented operating environment, and generating a hardware implementation of the processor enforcing the logical relationships of the instruction set as defined by the data structure. The data structure includes a class structure. The class structure and the instruction set unambiguously and precisely describe the operations of the processor.

In accordance with an aspect of the present invention, a processor includes a plurality of registers for directing the execution of object methods according to a predetermined data structure design. A memory includes data structures, including a class structure, that are defined for objects that are to be executed by the processor. The memory implements an object-oriented instruction set in accordance with the data structures. An execution unit executes object methods according to the object-oriented instruction set implemented in the memory.

In accordance with an aspect of the present invention, a processor includes an execution engine that is organized based on a class structure to execute a plurality of instructions of an object-oriented instruction set. The instruction set is executed using pointers for indexing through a plurality of data structures to define an object method for execution. At the top of the data structure is a class structure for selecting the static class for creating objects. Once the class is found by indexing through the class structure, an additional level of the data structure called a constant pool is accessed to supply information to further describe the data structures that are used for creating an object and executing an object method.

In accordance with an aspect of the present invention, a processor includes an execution unit and a memory. The memory stores a data structure including a class structure. A plurality of classifiers is selected by a program and loaded. The class structure directs the instantiation of the loaded classifiers into objects. The execution unit executes object methods directed by the class structure stored in the memory.

In accordance with an embodiment of the present invention, an object-oriented processor includes a memory storing a data structure including a class structure defined on an object-oriented basis and an execution unit connected to the memory including a logic for deriving a pointer into the class structure, the pointer designating a class for instantiating an object and executing the object as a method.

Many advantages are attained by the described object-oriented processor and operating method. It is advantageous that the advantages of object-oriented functionality are gained without incurring degradation in performance resulting from imposition of software overhead. It is advantageous that the advantages of object-oriented functionality are gained prior to software initialization. It is advantageous that object-oriented functionality is attained immediately upon hardware power-up so that faults in the software initialization process do not impair system functionality. It is advantageous that the implementation of object-oriented functionality in hardware reduces the complexity of a system.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1A:
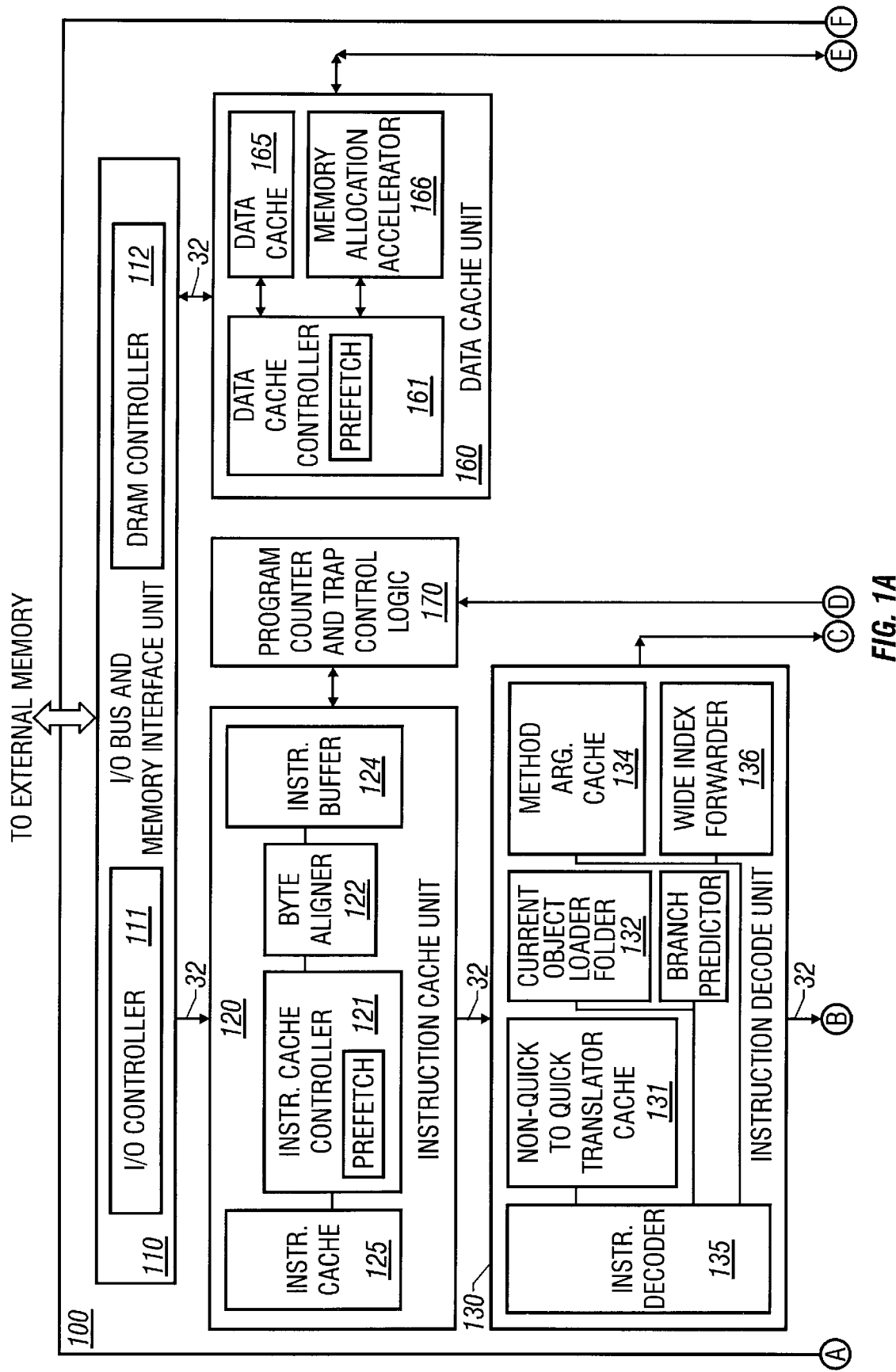
FIG. 1 is a block diagram of an embodiment of a virtual machine hardware processor.
Figure 1B:
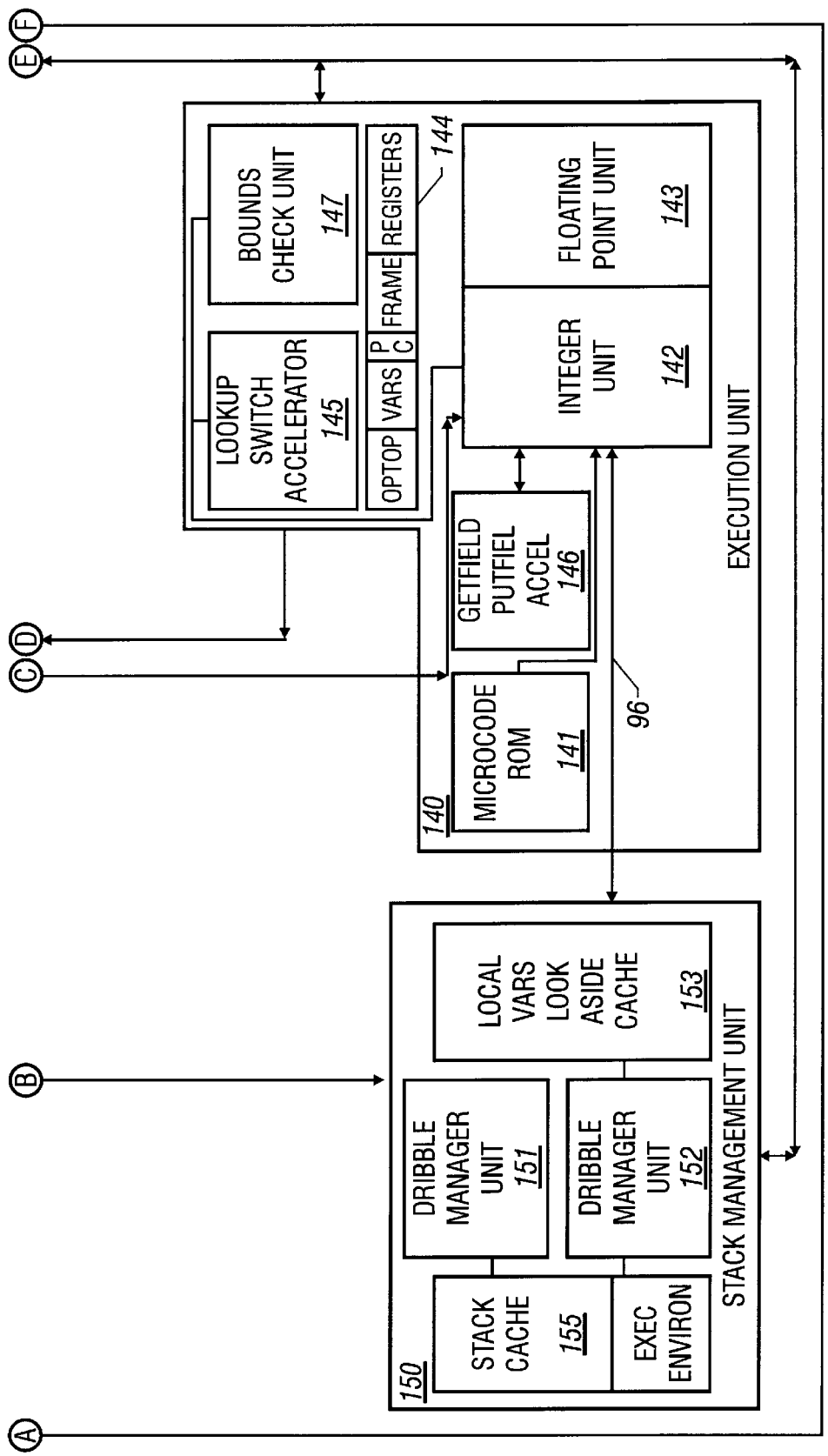

FIG. 1 illustrates one embodiment of a virtual machine instruction hardware processor 100, hereinafter hardware processor 100, in accordance with the present invention, and that directly executes virtual machine instructions that are processor architecture independent. The performance of hardware processor 100 in executing JAVA™ virtual machine instructions is much better than high-end CPUs, such as the Intel PENTIUM microprocessor or the Sun Microsystems ULTRASPARC processor, (ULTRASPARC is a trademark of Sun Microsystems of Mountain View, Calif., and PENTIUM is a trademark of Intel Corp. of Sunnyvale, Calif.) interpreting the same virtual machine instructions with a software JAVA™ interpreter or with a JAVA™ just-in-time compiler; is low cost; and exhibits low power consumption. As a result, hardware processor 100 is well suited for portable applications. Hardware processor 100 provides similar advantages for other virtual machine stack-based architectures as well as for virtual machines utilizing features such as garbage collection and thread synchronization.

In view of these characteristics, a system based on hardware processor 100 presents an attractive price for performance characteristics, if not the best overall performance, as compared with alternative virtual machine execution environments including software interpreters and just-in-time compilers. The illustrative embodiments apply to hardware implementing the JAVA™ virtual machine in microcode, directly in silicon, or in some combination thereof.

As used herein, the illustrative hardware machine implements instructions of the Java™ virtual machine where a virtual machine is an abstract computing machine that, like a real computing machine, has an instruction set and uses various memory areas. A virtual machine specification defines a set of processor architecture independent virtual machine instructions that are executed by a virtual machine implementation such as hardware processor 100. Each virtual machine instruction defines a specific operation that is to be performed, The virtual computing machine need not understand the computer language that is used to generate virtual machine instructions or the underlying implementation of the virtual machine. Only a particular file format for virtual machine instructions need to be understood.

Thus in an exemplary embodiment, the implemented machine instructions are JAVA™ virtual machine instructions. Each JAVA™ virtual machine instruction includes one or more bytes that encode instruction identifying information, operands, and any other required information.

In this embodiment, hardware processor 100 processes the JAVA™ virtual machine instructions, which include bytecodes. Hardware processor 100 executes directly most of the bytecodes. However, execution of some of the bytecodes is implemented via microcode.

In one embodiment, hardware processor 100 includes an I/O bus and memory interface unit 110, an instruction cache unit 120 including instruction cache 125, an instruction decode unit 130, a unified execution unit 140, a stack management unit 150 including stack cache 155, a data cache unit 160 including a data cache 165, and program counter and trap control logic 170. The instruction decode unit 130 decodes instructions which are issued to an execution unit. The execution unit executes instructions in accordance with content of a data structure.

The pipeline stages include fetch, decode, execute, and write-back stages. If desired, extra stages for memory access or exception resolution are provided in hardware processor 100.

Figure 2:
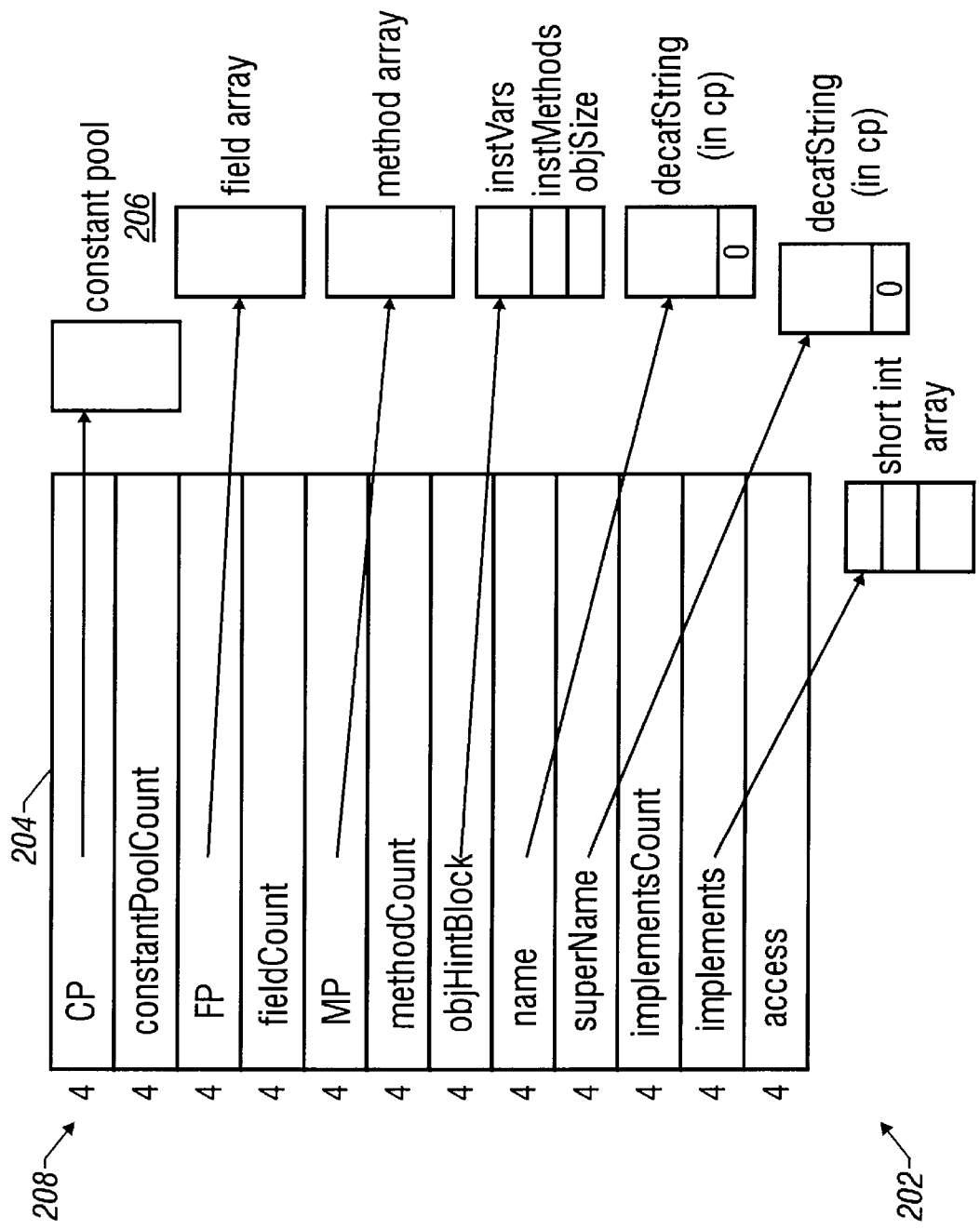
FIG. 2 is a schematic block diagram illustrating an object-oriented processor connected to a memory.

Referring to FIG. 2, a schematic block diagram illustrates an object-oriented processor 202 connected to a memory 204. The object-oriented processor 202 functions on an object-oriented basis of a class structure that is defined in terms of a memory layout. With the defined class structure, the object-oriented processor 202 derives a class pointer 208 and uses the class pointer 208 to create objects as instances of classes and execute the created objects. A class pointer 208 may be derived for each creation of an object or advantageously stored for efficient multiple instantiation of objects. A compiler is typically used to determine whether a particular class pointer is to be saved for multiple instantiation of objects. Because an object is the instantiation of a class, object information held in a constant pool 206 in the memory 204 is very simple. The object structure is stored as an array in the constant pool 206 as a block of condensed information of class structure. In the illustrative embodiment each class has an associated constant pool 206.

The object-oriented processor 202 implements instructions in the instruction set using direct access and indirect access of data in the data structures with variable levels of accessing the data structures. For example, the data structure in the memory 204 includes storage elements holding addresses for direct access in which hardware reads the address and directly accesses the address to retrieve data. In an indirect access, the data structure in the memory 204 includes storage elements holding a pointer to another storage element in the structure, the additional storage element holds an address that is retrieved using the pointer. The address is accessed and data is retrieved in the indirect access. For some objects, the data structure includes multiple levels of indirect addressing to access information. The class structure defines the number of levels of access. The class structure defines the objects for generation by the object-oriented processor 202. Some instructions direct that the object-oriented processor 202 jump from one object to another object with the class structure defining the destination of the jump operation.

In an illustrative embodiment, the class structure for the object-oriented processor 202 is defined by the existing Java™ Virtual Machine for Javasoft™. Existing processors available from Sun Microsystems, Inc. use the Java™ Virtual Machine class structure but the existing processor hardware is not optimized for the class structure and the instruction set. The existing processor implements the class structure generally in software so that advantages of the structure are attained only for high level operations or application level operations. In contrast, the illustrative object-oriented processor 202 gains advantages at the fundamental hardware level by integrating the class structure and the instruction set directly into the hardware design so that the class structure dictates the fundamental hardware operations of the object-oriented processor 202.

The illustrative object-oriented processor 202 has a hardware structure that uses multiple-level memory accesses to index each part of a multiple-part instruction and executing a method directed by the memory accesses using a technique such as trap emulation, microcode sequencing, or hard-coded hardware execution. The object-oriented processor 202 utilizes a relatively complex multiple-level data structure and multiple function instruction execution. For example, instruction execution includes accessing of multiple indices, adding of a constant pool location value to the indices to set a memory address, loading from the address, acquiring the content of the memory location. In some instruction embodiments the content of the memory location gives two indices including a class index, and a name and type index. The class index serves as basis for setting a class pointer. The class pointer designates a class for instantiating objects. The object-oriented processor 202 is substantially different from a conventional RISC processor which executes simple, individual operations in which most accesses are either a load operation or a store operation.

Figure 3:
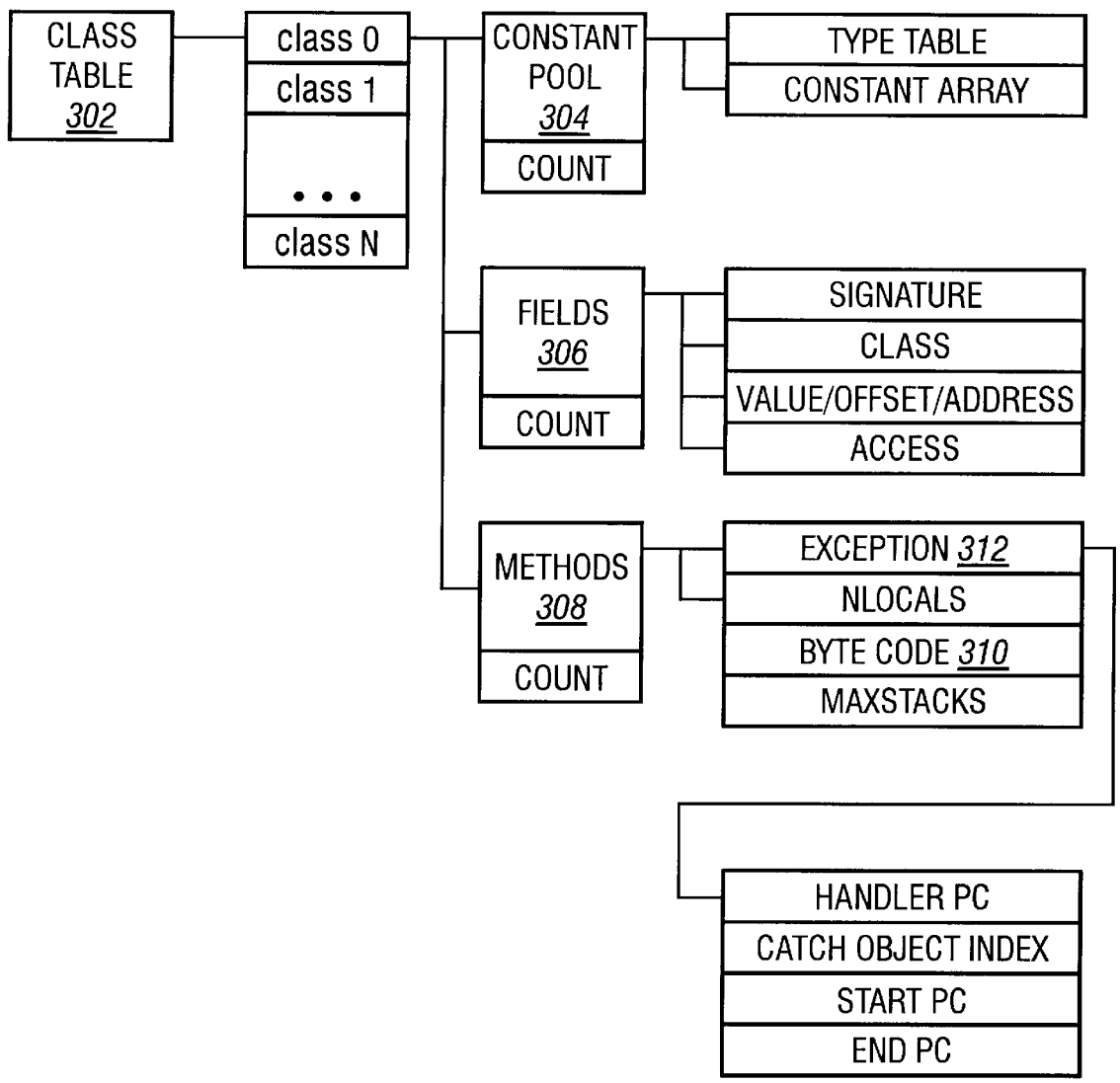
FIG. 3 is a schematic data structure diagram depicting a class structure which is derived from the data structures of a Java™ Virtual Machine implementation.

Referring to FIG. 3, a schematic block diagram depicts a class structure 300 which is derived from the data structures of a Java™ Virtual Machine implementation. The data structures of the object-oriented processor 202 are optimized for execution in hardware. The object-oriented processor 202 operates according to an hierarchical scheme with a class table 302 defining a first level in the hierarchy of the class structure 300. During execution, the object-oriented processor 202 creates new objects by instantiating selected classes, executing methods defined in the classes, creating objects, deleting objects, and the like.

The class structure 300 of the object-oriented processor 202 hierarchically begins with the class table 302. The class table 302 is a list of all possible classes used in the object-oriented processor 202. In the illustrative embodiment, the class contains three blocks, specifically a constant pool 304, fields 306, and methods 308. The constant pool 304 defines constant values used in the class. The fields 306 define variables, either objects or primitives for the class. The methods 308 define a byte code 310 to be executed and exception tables 312 for error handling.

The class table 302 is an array with an unlimited number of entries. In the illustrative embodiment, an entry in the class table 302 is a 32-bit memory address to a class. The last entry is zero to indicate the end of the class table 302. A class table 302 is useful for accessing all classes in the object-oriented processor 202. Trap handlers use the class table 302 for resolving traps. A power-on sequence uses the class table 302 to find a first class and instantiate the first class to activate the object-oriented processor 202. Error handlers use the class table 302 to locate an exception class and create an exception object from the exception class to process errors and other exception conditions.

The illustrative class structure 300 has eight 32-bit words. Each entry of the class table 302 is a four-byte wide, 32-bit word. A constant pool entry is the address to the constant pool 304 of the current class and a constantPoolCount is the length of the field array. For a particular class, the constantPoolCount is fixed. A fieldAddress entry is the address to the field array 306 of the current class and fieldCount is the length of the field array 306. A methodAddress entry is the address to the method array 308 of the current class and a methodCount entry is the length of the method array 308.

An objHintBlock entry is an address to a block containing useful information such as instance variables, instance methods, and the size of the object in bytes. The objHintBlock entry is useful for creating objects from the class efficiently. Information in the objHintBlock is entered during class resolution and used by various instructions, including a new instruction. A name entry holds the name of the current class and a superName entry holds the name of the superclass of the current class. To reduce memory space, strings defined in the constant pool are reused. Implements and implementsCount entries are applied for usage by interfaces. A value in the imnplements entry is an index to the constant pool table. The type of entry in the constant pool is of class type, which is an interface of Java™. An access entry is a short integer used to hold flags including a public access flag, a final access flag, a super access flag, an interface access flag, and an abstract access flag.

Figure 4:
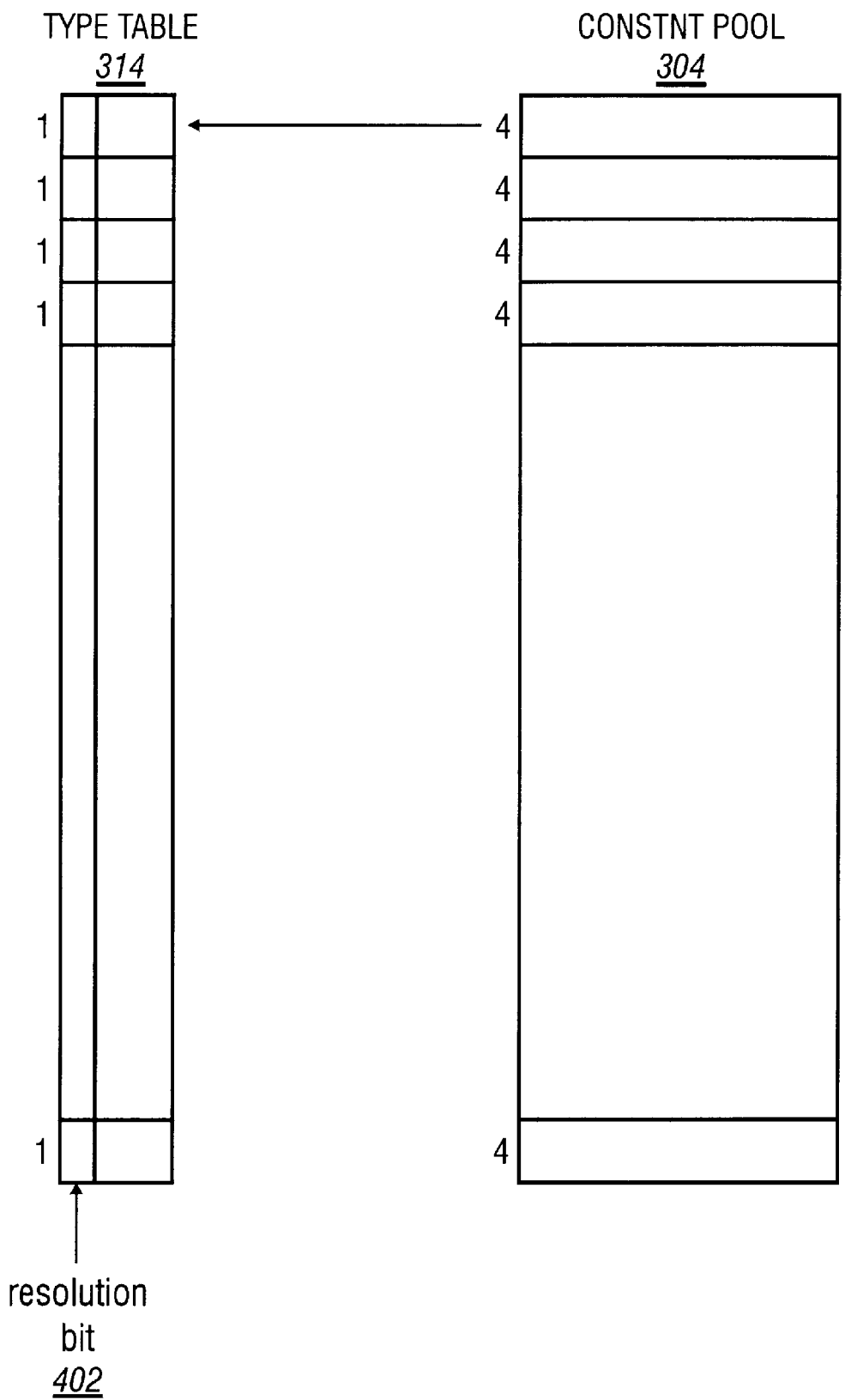
FIG. 4 is a schematic data structure diagram showing an embodiment of a constant pool, an array with four-byte entries used for storing constant data.

Referring to FIG. 4, the constant pool 304 is an array with four-byte entries used for storing constant data in the form of an integer, a generic pointer, a floating point number or a character pointer. Various stored data include a class, a field, a string, and a primitive. The first entry (cp[0]) in the constant pool 304 is the address to a type table. The length of the type table is the same as the length of the constant pool. Entries in the type table are one byte wide and represent the type of data stored in the corresponding field of the constant pool. The most significant bit of a type table entry is for resolution, indicating by a "1" value that the corresponding constant pool entry is resolved and the content is the data or address to the data. A "0" value of the resolution bit indicates that the constant pool entry is not resolved and the content is still and index to another constant pool entry. Possible types stored in the type table include a non-used entry, a CONSTANT type holding a string preceded by a 32-bit key field, an unused type, an integer type, a floating point type, a long type, a double type, a class type, a string type, a Fieldref type, a Methodref type, an InterfaceMethodref type, and a NameAndType type. A double constant is stored in two entries. MethodRef, FieldRef, NameAndTypeRef, and InterfaceMethodRef are stored as two short integers in one entry. The length in a CONSTANT_Utf8 is the length N of the c-string in bytes.

An example describes the content of a constant pool, as follows:

1, Class(0), index 14
2, Class(1), index 1137208 115a38←resolved class (current)
3, Fieldref, class index 2, nameType index 5

4, Methodref, class index 1, nameType index 6
5, NameAndType, name index 18, descriptor index 10
6, NameAndType, name index 17, descriptor index 19
7, Utf8*, location 116300h, value ConstantValue
8, Utf8*, location 11630eh, value Exceptions
9, Utf8*, location 116319h, value LineNumberTable
10, Utf8*, location 116329h, value I
11, Utf8*, location 11632bh, value SourceFile
12, Utf8*, location 116336h, value LocalVariables
13, Utf8*, location 116345h, value Code
14, Utf8*, location 11634ah, value java/lang/Object
15, Utf8*, location 11635bh, value t4.java
16, Utf8*, location 116363h, value aa
17, Utf8*, location 116366h, value <init>
18, Utf8*, location 11636dh, value xyz
19, Utf8*, location 116371h, value 0V
20, Utf8*, location 116375h, value I
21, Utf8*, location 116377h, value t4

In the illustrative example, only the second entry is resolved and the original index is replaced by the decaf class. The remaining reference entries are not resolved. During execution, resolution occurs on-the-fly. When a reference is encountered, the original index is replaced with the appropriate data structure and the index is replaced with the real value of the address to the value.

An example of a Type Table in a constant pool 304 is shown as follows using one byte per entry with the most significant bit reserved for resolution.

Figure 5:
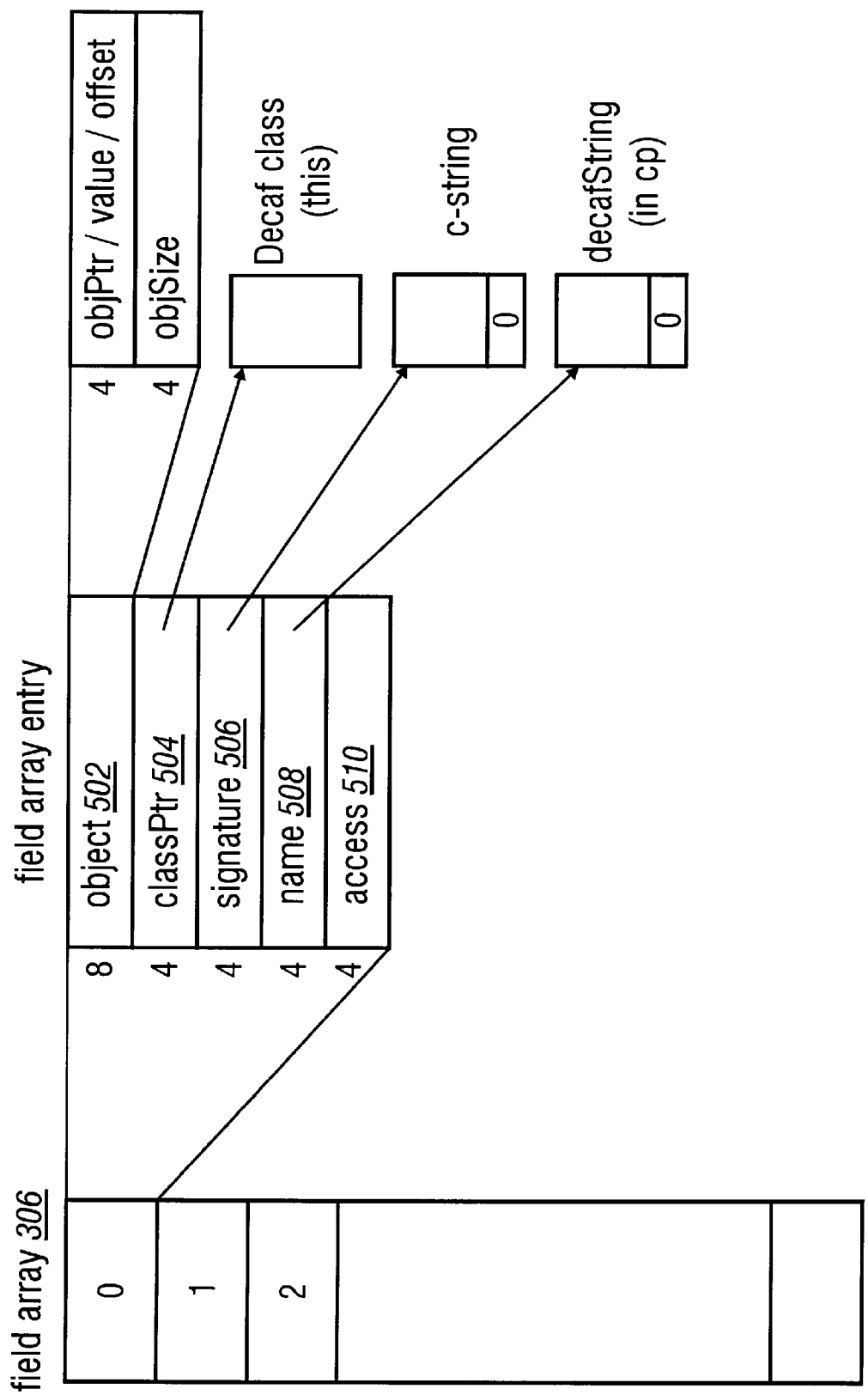
FIG. 5 is a schematic data structure diagram showing a field array layout including a collection of the fields defined in a current class.

0 non-used entry
1 CONSTANT_Utf8
2 CONSTANT_Unicode//unused
3 CONSTANT_Integer
4 CONSTANT_Float
5 CONSTANT_Long
6 CONSTANT_Double
7 CONSTANT_Class
8 CONSTANT_String
9 CONSTANT_Fieldref
10 CONSTANT_Methodref
11 CONSTANT_InterfaceMethodref
12 CONSTANT_NameAndType Referring to FIG. 5, the field array 306 is a collection of the fields defined in the current class. The field array 306 is used to store a static variable or an instance variable. A variable can be either an array or an object. The field structure of the field array 306 has four entries including a four-byte class index or class pointer classPtr 504, a string signature 506, an eight-byte content element holding the object 502, and a two-byte access 510 element. The entries in the field array 306 have a fixed length. For a particular entry in the field array 306, the first eight bytes store the value of the entry which is an object 502. The object 502 has one of several forms including an offset for an instance variable, a value for primitive data types, and object pointer objPtr for an array of primitives, an instance of a class or the like. If an object 502 is not a primitive, objPtr may be the address of the object and objSize the length of the object. If the field contains an instance variable, the object field is the field offset of the object instantiated from the class.

The second entry in the field array 306 is a class pointer classPtr 504 entry which specifies the address of the class containing the field. The third entry in the field array 306 is a signature 506 that describes the type of field entry. The signature 506 is a combination of characters including:

SIGNATURE_ARRAY '['
SIGNATURE_BYTE 'B'
SIGNATURE_CHAR 'C'
SIGNATURE_FLOAT 'F'
SIGNATURE_DOUBLE 'D'
SIGNATURE_INT 'I'
SIGNATURE_LONG 'J'
SIGNATURE_CLASS 'L'
SIGNATURE_ENDCLASS ';'
SIGNATURE_SHORT 'S'
SIGNATURE_VOID 'V'
SIGNATURE_BOOLEAN 'Z'

For example, a label '[I' designates that a field is an integer array. A label of 'Labc' designates that a field is an object of class abc.

The fourth entry in the field array 306 is a name 508 that designates the name of the field. Name 508 is a pointer to a string in the constant pool 304. All strings in the constant pool 304 contain a 32-bit key field at the first location.

The fifth entry in the field array 306 is an access 510 element that designates the access flag of the field. Access flag bits include, as follows:

ACC_PUBLIC 0x0001
ACC_PRIVATE 0x0002
ACC_PROTECTED 0x0004
ACC_STATIC 0x0008
ACC_FINAL 0x0010
ACC_VOLATILE 0x0040
ACC_TRANSIENT 0x0080

Figure 6:
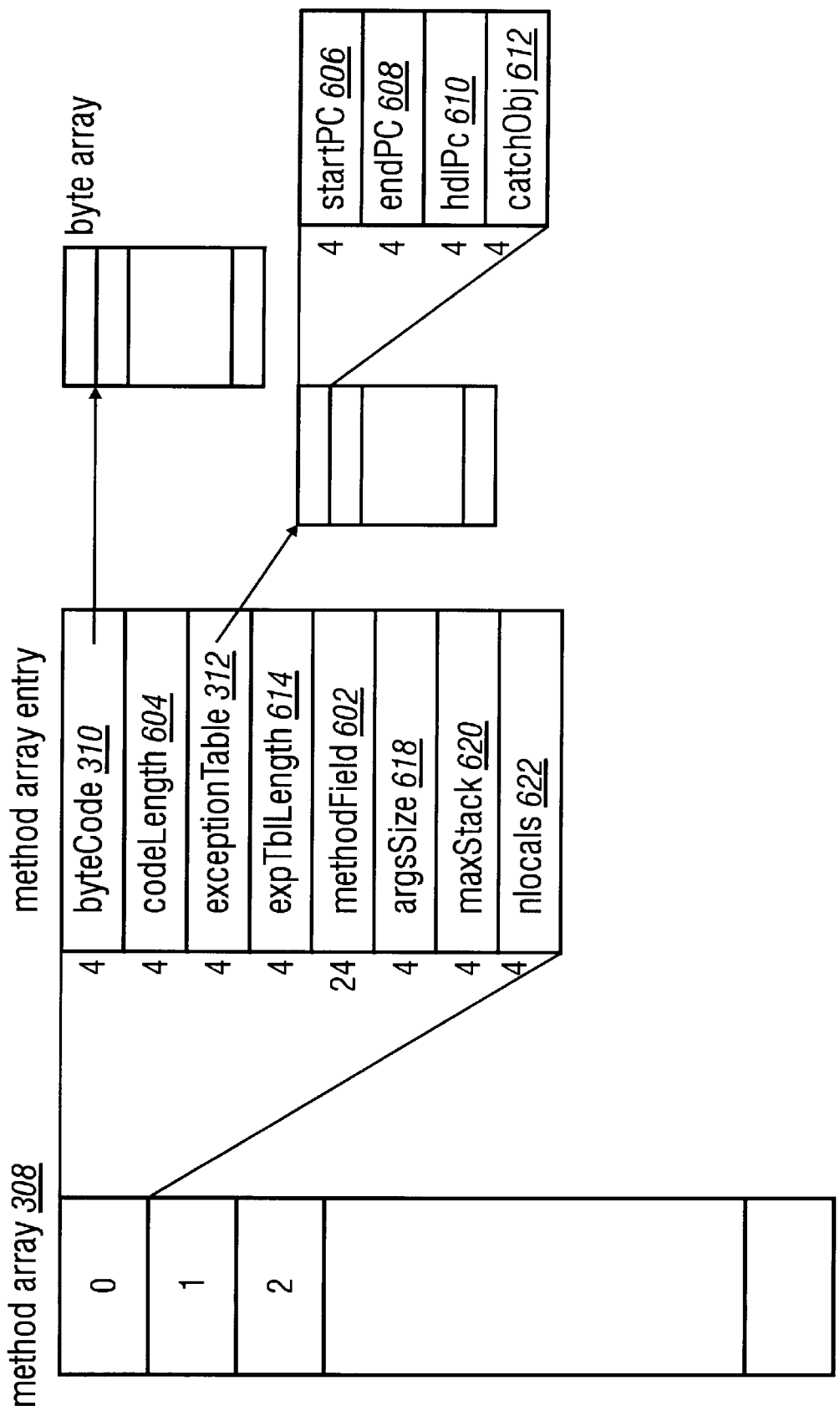
FIG. 6, is a schematic data structure diagram illustrating a method array for storing methods of a class.

Referring to FIG. 6, the method array 308 stores methods of a class. A method structure, as defined by the method array 308, includes the byte code 310, the exception tables 312, and several variables describing the byte code 310 and the exception tables 312. The entries in the method array 308 represent one method. The information held in an entry of the method array 308 includes a byte code 310 of the method, an exception table 312, a method field 602, and several variables to facilitate method invocation. The first entry in the method array 308 is the byte code 310, the address to the location of the actual byte-code. The byte-code is simply a memory block in the memory 204. The second entry in the method array 308 is a codeLength 604 designating the length of the byte code in the current method. The program counter starts from 0 for the execution of a method.

The third entry in the method array 308 is the exception tables 312, the address to the exception table. All entries in the exception table contain a longword startPC 606 designating the related starting address of the try block, a longword endPC 608 designating the end address of the try block, a longword hdlPC 610 supplying the related address of the catch clause, and a shortword catchObj 612 supplying the address of the exception object.

The fourth entry of the method array 308 is expTblLength 614, the length of the exception table. The method array 308 also includes a methodField 616 which is a field block having the same layout as an entry of the field array 306. The method signature, method name, and method access are stored in the methodField 616.

Several variables are stored in the method array 308. ArgsSize 618 is the length of the method arguments. Max- Stack 620 defines the maximum length of the possible used stack. Nlocals 622 stores the number of local variables.

Figure 7:
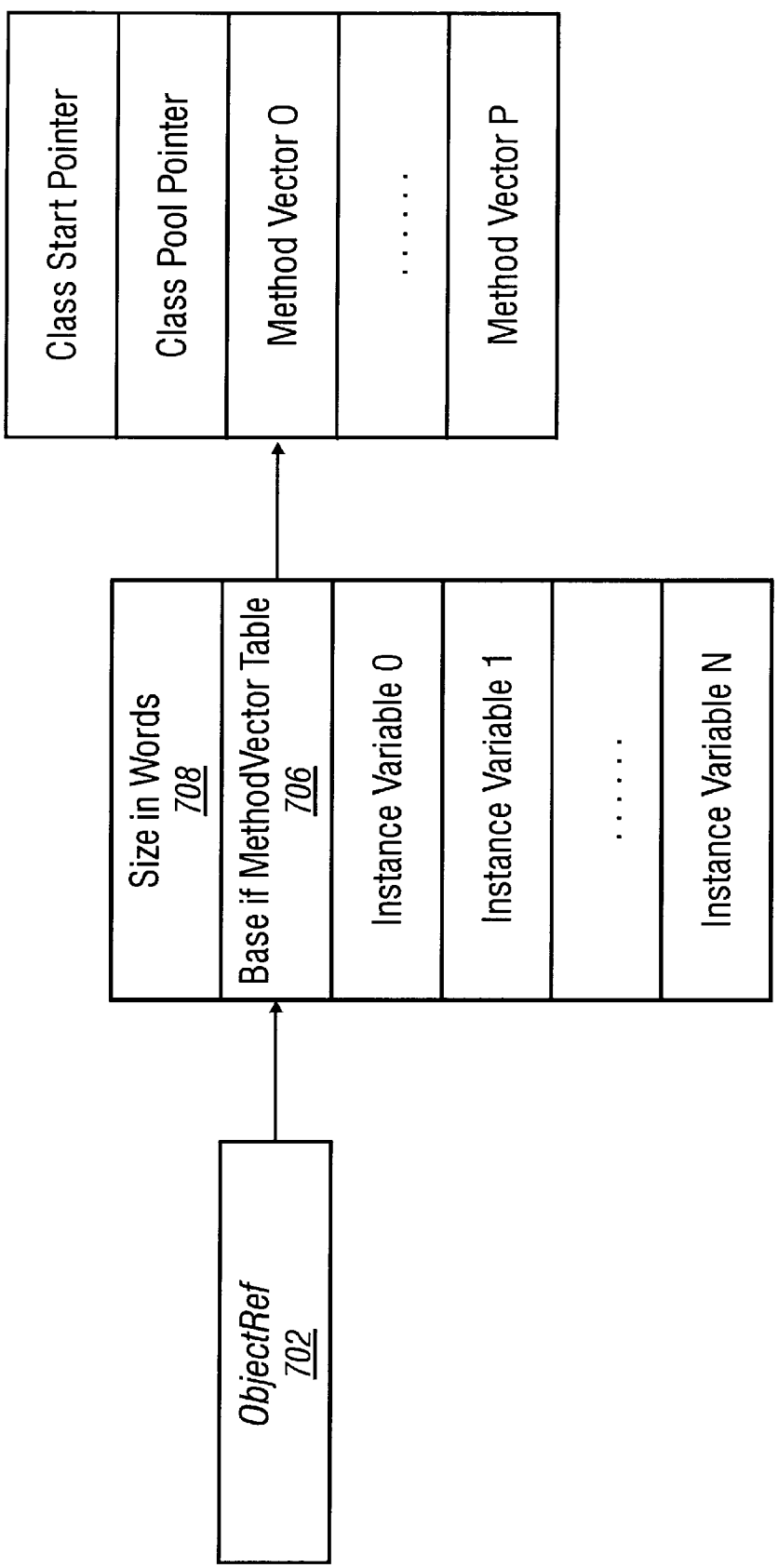
FIG. 7 is a schematic diagram illustrating an object format with a handle reference to illustrate the operations of the object-oriented processor in response to a trap.

Referring to FIG. 7, a schematic diagram illustrates an object format with a handle reference to illustrate the operations of the object-oriented processor 202 in response to a trap. An ObjectRef 702 is a pointer to a storage containing either the contents of an object for a "NO_HANDLE case" or another pointer to the actual storage for a "HANDLE case". In either case, the immediate storage object 704 that is pointed to by the ObjectRef 702 is associated with a separate pointer to a MethodVector 706, which is a per-class entity. The MethodVector 706 contains pointers to a message block table that is accessible for the target class. The MethodVector 706 also has pointers for the constant pool 304 and the Class Structure. The object storage 704 has a size field 708 which represents the size of the instance fields in 32-bit words. The size field 708 may be zero for an object with no instance fields defined.

Both the ObjectRef 702 and the base of the MethodVector 706 are word-aligned with the least significant bit (bit 0) of the ObjectRef 702 indicating whether the reference is a handle-based reference when the LSB is one, and otherwise indicating that the reference is a no-handle based reference. The second least significant bit (bit 1) specifies whether the object is an array object (bit1=1) or a nonarray object (bit1=0). The remaining two bits may be used for a garbage collector generation marking algorithm.

A class declaration specifies a new reference type and implements the class as an extension or subclass of an existing class, or as one or more interfaces. The body of a class declares members including fields and methods, static initializers, and constructors.

Fields are the variables of a class type. Class (static) variables exist once per class. Instance variables exist once per instance of the class. Fields include initializers and are modified using various modifier keywords.

A method declares executable code that can be invoked with a fixed number of values passed as arguments. Every method declaration belongs to some class.

A constructor is used in the creation of an object that is an instance of a class.

A Java™ Virtual Machine (JVM) signals an error to an executing Java™ program as an exception when the program violates the semantic constraints of the Java™ language. The exception is thrown upon the occurrence of a violation and causes nonsocial transfer of control from the location of the exception to a predetermined location. An exception is "thrown" from the location of occurrence and "caught" at the predetermined location. Java™ programs can throw exceptions explicitly using a "throw" statement An exception is represented as an instance of the class "throwable" or a "throwable" subclass. During the process of throwing an exception, a Java™ Virtual Machine abruptly completes any expressions, statements, method and constructor invocations, static initializers, and field initialization expressions that have begun but have not complete execution in the current thread.

Runtime data areas include a program counter (pc) register, a Java™ stack, a heap, a method area, a constant pool, and native method stacks. A pc register is associated with each JVM thread that is supported by the Java™ Virtual Machine during multiple-thread execution. The pc register contains the address of the Java™ Virtual Machine instruction that is currently executed when the executing method is not native. When the method is native, the pc register is undefined. The pc register is one word in width, a width sufficient to hold a returnAddress or a native pointer on the appropriate platform.

The Java™ stack is a private stack that is associated to each Java™ Virtual Machine thread and created at the creation of the thread. The Java™ stack stores Java™ Virtual Machine frames. The Java™ stack functions as a conventional stack, operating to store local variables and partial results and handling method invocation and return.

The Java™ Virtual Machine has a "heap" that is shared among all threads. The heap is a runtime data area from which memory for all class instances and arrays is allocated. The Java™ heap is created on virtual machine start-up. Heap storage for objects is reclaimed by an automatic storage management system, called a garbage collector. Objects are never explicitly deallocated.

The Java™ Virtual Machine has a method area that is shared among all threads. The method area is analogous to the storage area for compiled code of a conventional language. The method area stores pre-class structures including the constant pool, field and method data, and the code for methods and constructors. The method area is created on virtual machine start-up.

The constant pool is a per-class or per-interface runtime representation of the constant_pool table in a Java™ class file. The constant pool contains several types of constants including numeric literals that are known at compile time and method and field structures that are resolved at runtime. The constant pool operates in the manner of a symbol table for conventional programming languages, but contains a wider range of data than a typical symbol table. Each constant pool is allocated from the Java™ Virtual Machine method area. The constant pool for a class or interface is created when a Java™ class file for the class or interface is successfully loaded by the Java™ Virtual Machine. An OutOfMemoryError exception occurs when a class file is loaded if the creation of the constant pool is larger than the amount of memory that can be made available in the method area of the Java™ Virtual Machine.

An implementation of the Java™ Virtual Machine may use conventional stacks to support native methods written in languages other than Java™. A native method stack may be used to implement an emulator of the Java™ Virtual Machine instruction set in another language.

A Java™ Virtual Machine frame is used to store data and partial results, perform dynamic linking, return values for methods, and dispatch exceptions. A new frame is invoked each time a Java™ method is invoked. A frame is destroyed when the method completes, whether a normal or abnormal completion. Frames are allocated from the Java™ stack of the thread creating the frame. A frame has a set of local variables and an operand stack. The memory space for the frame variables and stack are allocated simultaneously since the size of the local variable area and the operand stack are known at compile time and the size of the frame data structure depends only on the implementation of the Java™ Virtual Machine. Only one frame, the "current frame" for the executing "current" method, is active at any point in a given thread of control. Operations on local variables and the operand stack are always with reference to the current frame.

A frame is no longer current when the method invokes another method or the method completes. When a method is invoked, a new frame is created and becomes current when control transfers to the new method. On return from the method, the current frame passes the result from the method invocation to the current method. Java™ Virtual Machine frames operate as though allocated on a stack with one stack per Java™ thread. A frame created by a thread is only directly referenced by that thread.

On each invocation of a Java method, the Java™ Virtual Machine allocates a Java™ frame which contains an array of local variables and contains an operand stack. Most Java™ Virtual Machine instructions take values from the operand stack of the current frame, operate on the values, and return the results of the operations on the same operand stack. The operand stack is also used to pass arguments to methods and receive results from the methods.

A Java™ Virtual Machine frame contains a reference to the constant pool for the type of the current method to support dynamic linking of the method code. The class file code for a method refers to methods to be invoked and variables to be accessed via symbolic references. Dynamic linking translates the symbolic method references into fixed method references, loads classes to resolve undefined symbols, and translates variable accesses into offsets in storage structures associated with runtime location of the variables.

A method invocation completes normally if the invocation does not cause an exception to be thrown, either directly from the Java™ Virtual Machine or resulting from execution of an explicit throw statement. Upon normal completion of an invoked method by execution of a return instruction, the invoked method may return a value to the invoking method. The Java™ Virtual Machine frame restores the state of the invoking method including restoration of local variables, operand stack, and the program counter incremented past the method invoking instruction.

A method invocation completes abnormally if execution of a Java™ Virtual Machine instruction within the method causes the Java™ Virtual Machine to throw an exception and the exception is not handled within the method. Evaluation of an explicit throw statement also causes an exception to be thrown and, if the exception is not caught by the current method, results in abnormal method completion. A method that completes abnormally does not return a value to the invoking method.

At the level of the Java™ Virtual Machine, the constructors function as instance initialization methods having a special name <init>, which is supplied by a Java™ compiler. The name <init> is not a valid identifier and therefore cannot be used directly by a Java™ programmer. Instance initialization methods are invoked within the Java™ Virtual Machine using an invokespecial instruction and are invoked only on uninitialized class instances.

At the level of the Java™ Virtual Machine, a class or interface is initialized by invoking the appropriate class initialization method or interface initialization method with no arguments having a special name <clinit>, which is supplied by a Java™ compiler. The name <clinit> is not a valid identifier and therefore cannot be used directly by a Java™ programmer. Class and interface initialization methods are invoked indirectly and implicitly by the Java™ Virtual Machine as part of the class initialization process. Class and interface initialization methods are neither invoked directly from Java code nor directly from a Java™ Virtual Machine instruction.

In general, throwing of an exception causes an immediate dynamic transfer of control that may exit multiple Java™ statements and multiple constructor invocations, static and field initializer evaluations, and method invocations until a catch clause is found that catches the thrown value. If no catch clause is found in the current method, then the current method invocation completes abnormally. The operand stack and local variables are discarded and the frame is popped, reinstating the frame of the invoking method. The exception is then rethrown in the context of the invoker's frame, continuing a chain of method invocations. If no suitable catch clause is found prior to reaching the top of the method invocation chain, execution of the thread that threw the exception is terminated.

At the level of the Java™ Virtual Machine, each catch clause describes the Java™ Virtual Machine instruction range for which the catch clause is active, describes the types of exceptions to handle, and supplies the address of the exception handling code for the exceptions. An exception matches a catch clause if the instruction that caused the exception is in an appropriate instruction range and the exception type is the same type or a subclass of the class of exception that the catch clause handles. If a matching catch clause is found, the system branches to the specified handler. If no handler is found, the process is repeated until all nested catch clauses of the current method are exhausted. Catch clauses are ordered and Java™ Virtual Machine execution continues at the first matching catch clause. Java™ code is structured, therefore all exception handlers for one method may be arranged in a single list. For any possible program counter value, the list can be searched to determine the innermost exception handler that contains the program counter and handles the exception that is thrown.

If no matching catch clause exists for a current method, then the current method has an "uncaught exception" and the execution state of the invoking method is restored. Propagation of the exception continues as though the exception had occurred in the invoker at the instruction that invoked the method within which the exception originated.

The Java™ Virtual Machine creates and manipulates objects, including class instances and arrays, using specific instructions for object creation and manipulation. A new instruction creates a new class instance. Newarray, anewarray, and multianewarray instructions create a new array. Getfield, putfield, getstatic, and putstatic instructions access fields of classes (static fields, known as class variables) and fields of class instances (nonstatic fields, known as instance variables). Baload, caload, saload, iaload, laload,faload, daload, and aaload instructions load an array component onto the operand stack. Bastore, castore, sastore, iastore, lastore, fastore, dastore, and aastore instructions store a value from the operand stack as an array component. Arraylength gets the length of an array. Instanceof and checkcast check properties of class instances or arrays. The Java™ Virtual Machine invokes methods and returns results using specific instructions. An invokevirtual instruction invokes an instance of a method of an object, dispatching on the virtual type of the object. The invokevirtual instruction is the usual method of dispatch. An invokeinterface instruction invokes a method that is implemented by an interface and searches the methods implemented by the particular runtime object to find the appropriate method. An invokespecial instruction invokes an instance method using special handling, either an instance initialization method <int>, a private method, or a superclass method. An invokestatic instruction invokes a class (static) method in a named class. Method return instructions are distinguished by return type and include ireturn, lreturn, freturn, dreturn, and areturn instructions. A return instruction returns from methods declared as void.

The Java™ Virtual Machine allows programming of a thrown exception using an athrow instruction. Exceptions are also thrown by various Java™ Virtual Machine instructions upon detection of an abnormal condition.

The new instruction is a bytecode instruction which is called to create a new object. Execution of the new instruction is directed by a class structure including a constant pool. The constant pool includes an objectHint field. The new instruction uses information in the objectHint to create an object structure based on a structure set forth by the constant pool. A single object structure in the constant pool is used to create or instantiate a plurality of objects. The particular class used in the new instruction to instantiate objects is determined by arguments to the instruction. Arguments of the new instruction include an indexbyte1 and an indexbyte2 that are concatenated to form an index into the constant pool of the current class. The item at the specified index to the constant pool must have the tag CONSTANT_Class. The symbolic reference is resolved and must result in a class type and not in an array or interface type. Memory for a new instance of the designated class is allocated from a garbage-collecting heap. Instance variables of the new object are initialized to default initial values. The ObjectRef is a reference to the instance and is pushed onto the operand stack. During the resolution of the CONSTANT_Class constant pool item, any exception may be thrown. Otherwise, if the CONSTANT_Class constant pool item resolves to an interface or is an abstract class, the new instruction throws an InstantiationError. Otherwise, if the current class does not have permission to access the resolved class, the new instruction throws an IllegalAccessError.

The new instruction does not completely create a new instance. Instance creation is not completed until an instance initialization method has been invoked on the uninitialized instance.

Figure 8:
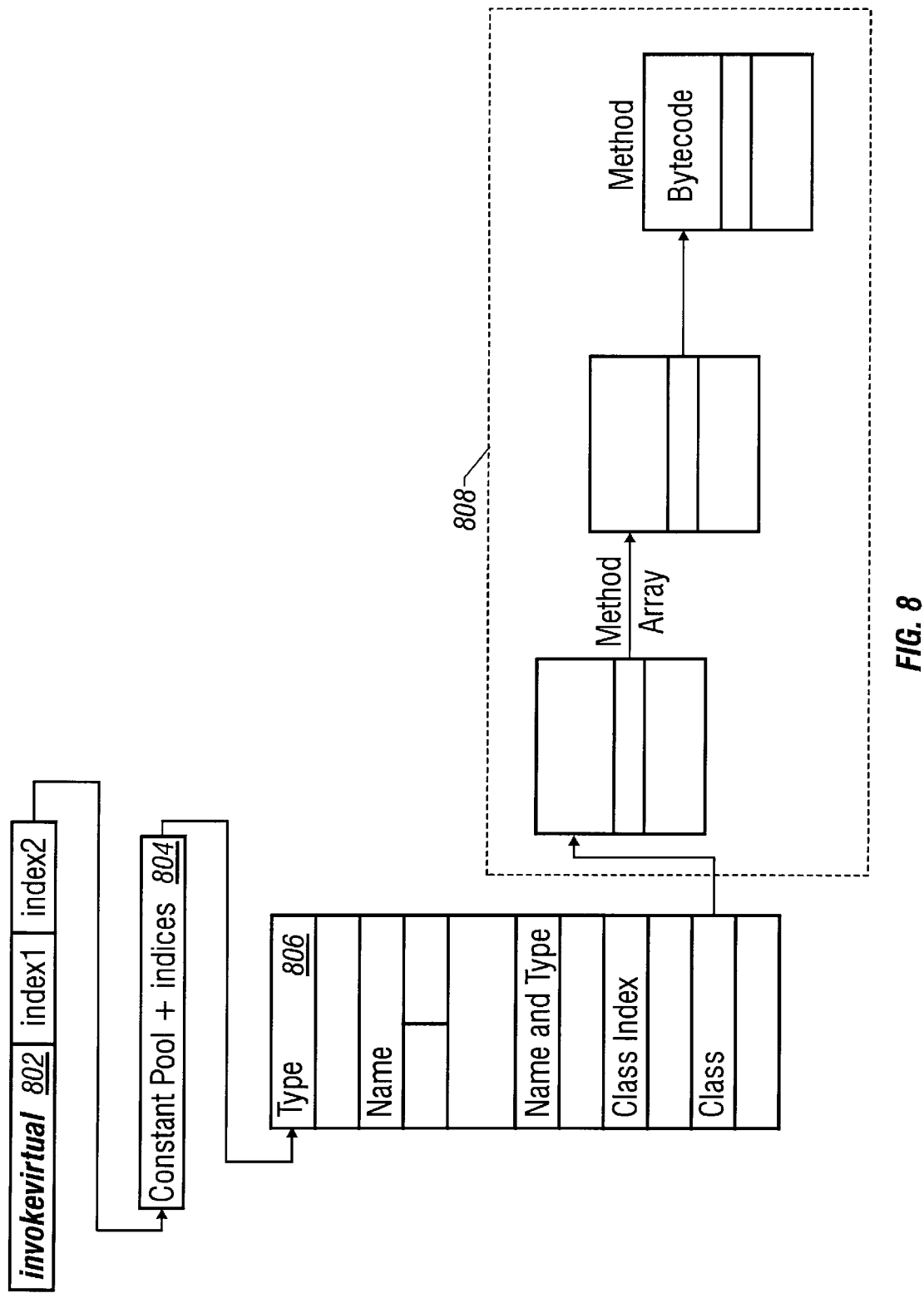
FIG. 8 is a schematic block diagram depicting a data structure for implementing an invokevirtual instruction.

Referring to FIG. 8, a schematic block diagram depicts a data structure 800 for implementing an invokevirtual instruction. The invokevirtual instruction is called to invoke an instance method with dispatch based on class. Arguments of the invokevirtual instruction in an instruction register 802 include an indexbyte1 and an indexbyte2 that are concatenated to form an index or pointer into the constant pool of the current class. The index is held in a constant pool register 804 and applied to address the constant pool 806. The constant pool 806 includes an entry which contains information relating to the method to be invoked by the invokevirtual instruction. The constant pool 806 is an element of the data structure for defining a method to be invoked by an instruction of the instruction set. The constant pool 806 contains an index1 and an index2. The index1 is an index to a method reference. The index2 designates a class index which points to a name and type. The class index points to a class structure 808. One entry of the class index designates a name. A second entry designates a type in the form of a string. The class pointer designates the class data structure 808 which designates a method name of the selected method and a method array containing a ByteCode for implementing the method. Upon identification of the ByteCode, the ByteCode is executed. Accordingly, the data structure is used to direct the designated instruction of the instruction set to a class index, to a class pointer, thereby designating a method for execution.

The implementation of hardware follows directly from the specification of an instruction as defined by the Java™ Virtual Machine Specification, Lindholm T. and Yellin, F., 1997, Sun Microsystems, Inc. which is hereby incorporated by reference in its entirety. For example, the Java Virtual Machine specification states "if the method is protected, then it must be either a member of the current class or a member of a superclass of the current class". Hardware is implemented to include logic that determines the stated conditions and satisfies the conditions. Thus the hardware accesses the class structure, finds the superclass and the class in the constant pool 806 based on the data structure. The data structure defines the relationship between the memory address and actual data. Each location including a content. The content may be another address, based on the address you search for another content, eventually the data is obtained. The logical operations are implemented using various techniques including digital logic circuits, microcode, trap emulation, and the like.

The item at the specified index to the constant pool must have the tag CONSTANT_Methodref, a reference to the class name, a method name, and descriptor of the method. The named method is resolved. The descriptor of the resolved method must be identical to the descriptor of one of the methods of the resolved class. The method must not be either <init>, an instance initialization method, or <clinit>, a class or interface initialization method. If the method is protected, then the method must be either a member of the current class or a member of a superclass of the current class, and the class of objectref must be either the current class or a subclass of the current class.

The constant pool entry representing the resolved method includes an unsigned index into the method table of the resolved class and an unsigned byte nargs that is not equal to zero. The objectref is of the type reference. The index is used as an index into the method table of the class of the type of objectref. If the objectref is an array type, then the method table of the class Object is used. The table entry at that index includes a direct reference to the code for the method and modifier information for the method. The objectref is followed on the operand stack by nargs-1 words of arguments, where the number of words of arguments and the type and order of the values represented is consistent with the descriptor of the selected instance method.

If the method is synchronized, then the monitor associated with the objectref is acquired.

If the method is not native, the nargs-1 words of arguments and objectref are popped from the operand stack. A new stack frame is created for the method invoked, and objectref and the words of arguments are made the values of the first nargs local variables with objectref in local variable 0, arg1 in local variable 1, and the like. The new stack frame is made current and the Java™ Virtual Machine program counter (pc) is set to the opcode of the first instruction of the method to be invoked. Execution continues with the first instruction of the method.

If the method is native and the platform-dependent code that implements the method has not yet been loaded and linked into the Java™ Virtual Machine, the method is linked and loaded. The nargs-1 words of arguments and objectref are popped from the operand stack and the code that implements the method is invoked in an implementation-dependent manner.

During resolution of the CONSTANT_Methodref constant pool item, any exception can be thrown. Otherwise, if the specified method exists but is a class (static) method, the invokevirtual instruction throws an IncompatibleClassChangeError. Otherwise, if the specified method is abstract and the code that implements the method cannot be loaded or linked, invokevirtual throws and UnsatisfiedLinkError.

Otherwise, if objectref is null, the invokevirtual instruction throws a NullPointerException.

Figure 9:
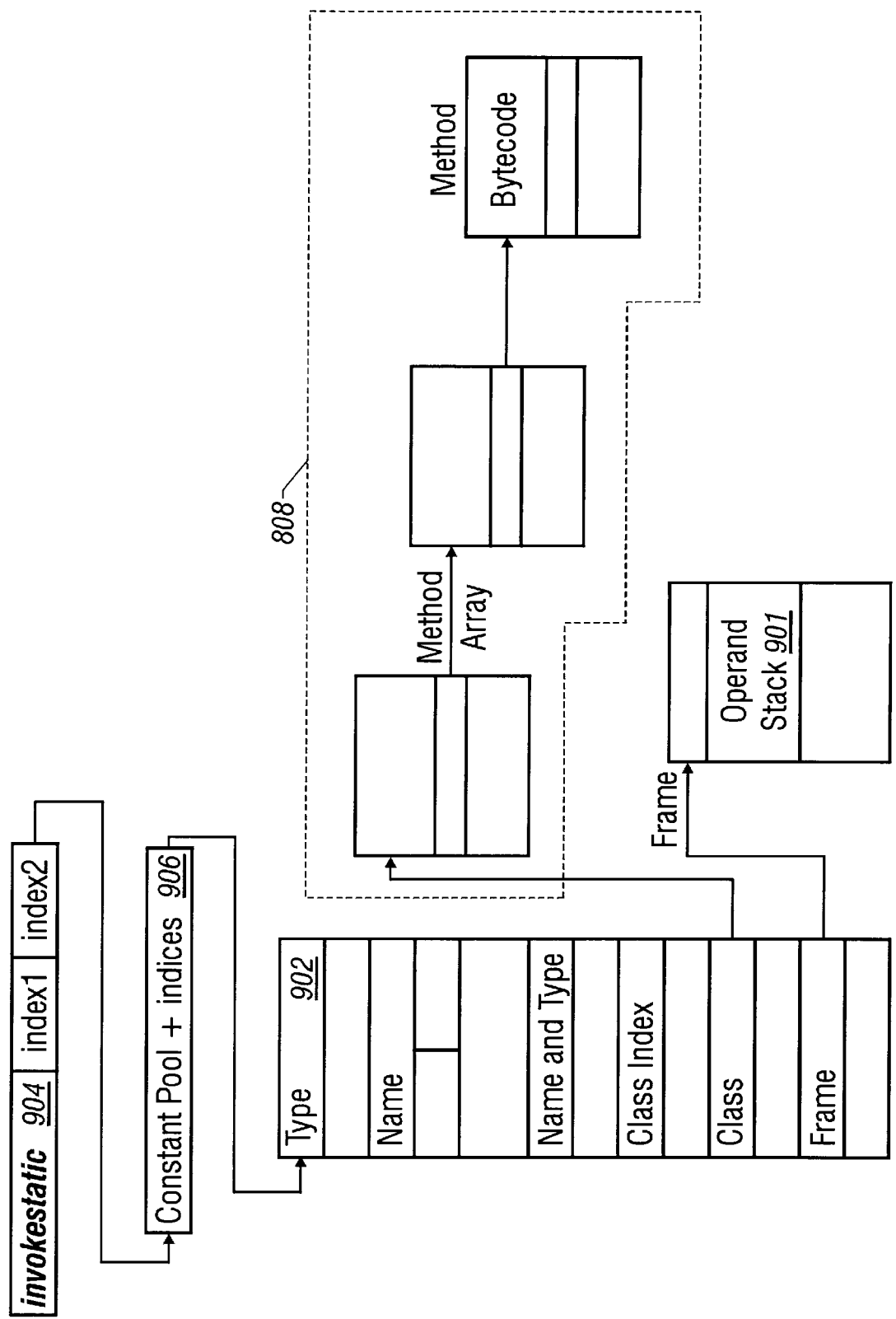
FIG. 9 is a schematic block diagram depicting a data structure for implementing an invokestatic instruction.

Referring to FIG. 9, a schematic block diagram depicts a data structure 900 for implementing an invokestatic instruction. The instructions, including complicated instructions, execute methods that are defined in relation to the class structures. For example, an invokestatic instruction operates as a function call to call other designated functions. Invokestatic is a function call with a plurality of arguments. The arguments are pushed onto an operand stack 901, hardware acquires local variables from a constant pool 902 based on an index defined by the arguments, finds a class that contains a method to be invoked and directs a jump, in the form of a subroutine call to a function called the method. The method is executed. When the method execution is complete, hardware pops the operand stack 901 and executes a return. A decoder (not shown) decodes an instruction and places a decoded code in an instruction register 904 including and instruction designation and an argument designation. The data structure 900 specifies class information such as a class or superclass, an object instantiated from the class, and a method executing an object of the class. The data structure 900 also includes locations in memory that store information for executing the selected method. The data structure 900 includes a constant pool 902 that specifies the class that contains a function and the location of a method to be executed. The processor 202 accesses information in the data structure 900 and operates on the information to execute a selected object method. Once an instruction is decoded as an invokestatic instruction, the next two bytes in the instruction register 904 are defined to specify an index to the constant pool 902. A constant pool register 906 is set according to the decoded instruction and index information to access an entry in the constant pool 902 that contains the invokestatic method. Hardware (not shown) accesses the content of the entry in the constant pool 902 and receives an identifier of another entry in the constant pool 902 that includes a content that identifies the name of a method for execution in addition to a type and a signature of the method. The signature is functional argument of the method in the form of a string.

The name, type and signature information in the constant pool 902 are accessed and used to control the operations of logic that determine the functionality of the object-oriented processor 202. The specific logic follows explicitly according to the defined configuration. In an illustrative embodiment, the defined configuration is based on the Java Virtual Machine Specification including an instruction set definition that describe precisely how the multiple instructions function. The Java™ Virtual Machine Specification describes the content of the constant pool 902 and directs how the content of the constant pool 902 is translated to logical operations. The Class structure supplements the description of the instruction set in the Java™ Virtual Machine specification to define the operating logic of the object-oriented processor 202. The logic may take several forms such as digital logic circuitry, microcode, or execution by trap emulation. In one embodiment, logic hardware is used to implement simple instructions such as instructions operable with respect to static classes, for example the invokestatic instruction, while microcode and trap emulation operations are used to implement more complicated instructions. Hardware logic advantageously achieves an improved performance. Microcode and trap emulation operations advantageously simplify complicated logic operations and reduce circuit size.

In some embodiments, a hardware implementation of the instruction set defined by the Java™ Virtual Machine Specification is explicitly determined by the specification of each instruction. For example, the invokestatic instruction specifies that unsigned indexbyte1 and indexbyte2 are used to construct an index into the constant pool 902 where the value of the index is (indexbyte1<<8)| indexbyte2. Hardware logic shifts the indexbyte1 by eight bits, concatenates the shifted indexbyte1 and indexbyte2, and applies the resulting concatenated word as a pointer to the constant pool 902.

The Java™ Virtual Machine Specification then states that the item at the index address have the tag CONSTANT_MethodRef, a reference to the class name, a method name, and the method's descriptor. This statement specifies a required structure for the constant pool 902. Hardware includes logic for resolving the constant pool 902 structure, determining whether the required structure is implemented in the constant pool 902 and activating an exception for violations. The Java™ Virtual Machine Specification designates that the named method is resolved, dynamically determining concrete values from symbolic references in the constant pool 902. To resolve the method reference, hardware logic resolves the CONSTANT_Class entry representing the class of which the method is a member and throws an exception if resolution is not successfully achieved. The name_index of a CONSTANT_Class constant pool entry is a reference to a CONSTANT_Utf8 constant pool for a UTF-8 string that represents a fully qualified name of the class to be resolved. Hardware logic determines the type of entry that is represented by the CONSTANT_Class constant pool entry and resolves the entry as follows. First, hardware logic includes a comparator for determining whether the first character of the fully qualified name of the constant pool entry to be resolved is a left bracket ("["). The entry is an array class if the entry is a left bracket and otherwise is in a nonarray class or to an interface. Hardware logic then directs operations in alternate paths depending on the type of class. If the first character of the fully qualified name of the constant pool entry to be resolved is a left bracket, then the entry is a reference to an array class and a special resolution is invoked.

For the non-array class, hardware logic first loads the designated class and associated superclasses by first finding, then loading, the class and superclasses. If no file with an appropriate name is found and read, hardware logic throws a NoClassDefFoundError. Otherwise, if the hardware logic tests characteristics of the selected file and determines that the file is not a well-formed class file or is not a class file of a supported major or minor version, class or interface, then the hardware throws a NoClassDefFoundError. The NoClassDefFoundError is also thrown by the hardware logic if the hardware logic determines that the selected class file does not contain the desired class or interface. If the selected class file does not specify a superclass and is not the class file for the class file for class Object, then the class or interface resolution throws a ClassFormatError.

If the superclass of the specified class to be loaded is not yet loaded, hardware detects any loading errors, then recursively loads the class. All interfaces are to have a previously loaded Java.lang.Object as a superclass.

If loading of the class and superclass was successful, the hardware logic links and initializes the class. Hardware links a class by verifying that the class is suitable and preparing the class for execution. First, the hardware logic verifies the class or interface to ensure that the binary representation of the class is structurally valid. Verification may cause classes and interfaces to be loaded but not initialized. If the class or interface contained in a class file does not satisfy static or structural constraints imposed on valid class files, the hardware logic throws a VerifyError. If the hardware logic successfully verifies the class or interface, then hardware logic prepares the class or interface. Hardware logic prepares the class or interface by creating static fields for the class or interface and initializing the fields to standard default values. During preparation, hardware logic throws an AbstractMethodError if the class is not declared abstract and has an abstract method.

Hardware logic then initializes the class. If hardware logic serving as an initializer completes abruptly by throwing an exception and the class of the exception is not the class Error or one of the subclasses of the class Error, then the hardware logic creates an instance of the class ExceptionInInitializerError which is used in place of the Error object. If the hardware logic unsuccessfully attempts to create a new instance of the class ExceptionInInitializationError because an OutOfMemoryError occurs, then the hardware logic throws the OutOfMemoryError.

Hardware logic then checks the access permissions of the class being resolved. If the current class or interface does not have permission to access the class or interface being resolved, then the hardware logic throws an IllegalAccessError.

If the hardware logic detects no errors, constant pool resolution of the class or interface is successful. Alternatively, if the hardware logic detects an error, resolution is unsuccessful and the hardware logic prevents accessing of the referenced class or interface.

If the constant pool resolution of the class or interface is successful, hardware logic then performs further tests to determine whether linking of the method or field is successfully resolved. Hardware logic determines whether the referenced field exists in the specified class or interface and, if not, throws a NoSuchFieldError. The hardware logic determines whether the current class has permission to access the referenced field and, if not, throws an IllegalAccessError exception.

The hardware logic compares the descriptor of the resolved method and verifies that the descriptor is identical to the descriptor of one of the methods of the resolved class. The hardware logic verifies that the method is neither an instance initialization method (<init>) nor a class or interface initialization method (<clinit>). The hardware logic verifies that the method is static and not abstract. The hardware logic determines whether the method is protected and, if so, verifies that the method is either a member of the current class or a member of a superclass of the current class.

The entry constant pool 902 representing the resolved method includes a direct reference to the code for the method, an unsigned byte nargs that may be zero, and the modifier information of the method.

The hardware logic verifies that the operand stack 901 contains nargs words of arguments, where the number nargs and the type and order of the values of the arguments is consistent with the descriptor of the resolved method.

For a method that is synchronized, the hardware logic acquires the monitor associated with the current class.

For a method that is not "native", hardware logic pops the nargs words from the operand stack 901. The hardware logic creates a new stack frame for the method invoked and transfers the words of the arguments to the first nargs local variables. The hardware logic makes the new stack frame current and sets a program counter 904 to the opcode of the first instruction of the method to be invoked and execution continues with the first instruction of the method.

If the method is "native", the hardware logic pops the nargs words of arguments from the operand stack 901. The hardware logic then invokes the method.

The illustrative object-oriented processor 202 is a hardware implementation of instructions defined by the Java™ Virtual Machine. Hardware implements the instructions of the Java instruction set with a data structure including an object structure defining the structure and operations of the hardware. The hardware is typically and variously implemented in different embodiments using digital hardware logic, microcode, and trap emulation. In other embodiments, other known technologies such as state machines, analog logic, and the like may be utilized. In the illustrative embodiment of an object-oriented processor 202, the instructions of the instruction set are implemented as a method or algorithm in the form of a computer operation operating with respect to a data structure. In contrast, a conventional Java™ Virtual Machine processor operates a software application at a level higher than a software operating system.

Instructions of the instruction set include hardware that generally operates in the manner of the hardware for implementing the illustrative invokestatic instruction including accessing a constant pool, finding a class and then a method based on the information in the constant pool, then executing the method. The memory of the constant pool is consistently laid out so that a two-byte index is sufficient for designating a particular method. More simple instructions generally use a smaller portion of the data structure to define the operation of the method. Some instructions simply use the operand stack alone. More complex instructions generally use a larger portion of the data structure using indirect memory accessing to traverse several levels of the data structure, acquiring additional information for executing the method in the multiple levels of the data structure.

The putstatic instruction is called to set a static field in a class. Arguments of the putstatic instruction include an indexbyte1 and an indexbyte2 that are concatenated to form an index into the constant pool of the current class. The item at the specified index to the constant pool must have the tag CONSTANT_Methodref, a reference to the class name, and a field name. If the method is protected, then the method must be either a member of the current class or a member of a superclass of the current class.

The constant pool item is resolved, determining both the class field and the class field width. The type of value stored by a putstatic instruction must be compatible with the descriptor of the field of the class instance into which the value is stored. The value is popped from the operand stack and the class field is set to value.

During resolution of the CONSTANT_Methodref constant pool item, any exception can be thrown. Otherwise, if the specified field exists but is not a class static field (a class variable), the putstatic instruction throws an IncompatibleClassChangeError.

The athrow instruction throws an exception or error. The athrow does not include an argument. An objectref must be of the type reference and refer to an object which is an instance of class Throwable or of a subclass of Throwable. The objectref is popped from the operand stack. The objectref is then thrown by searching the current frame for the most recent catch clause that catches the class of objectref or one of the superclasses of the objectref. It a catch clause is found, the catch clause contains the location of the code intended to handle the exception. The pc register is reset to the catch clause location, the operand stack of the current frame is cleared, objectref is pushed back onto the operand stack, and execution continues. If no appropriate clause is found in the current frame, the frame is popped, and the frame of the method invoker is reinstated, and the objectref is rethrown. If no catch clause is found that handles this exception, the current thread exits.

If objectref is null, athrow throws a NullPointerException instead of objectref.

The operand stack operation for the athrow instruction functions as follows: If a handler for an exception is found in the current method, the athrow instruction discards all words on the operand stack, then pushes the thrown object onto the stack. However, if no handler is found in the current method and the exception is thrown farther up the method invocation chain, then the operand stack of the method, if any, that handles the exception is cleared and objectref is pushed onto the empty operand stack. All intervening stack frames from the method that threw the exception up to but not including the method that handles the exception are discarded.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the described parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. An object-oriented processor comprising:
   a memory storing a data structure including a class structure defined on an object-oriented basis;
   an execution unit coupled to the memory including a logic for deriving a pointer into the class structure, the pointer designating a class for instantiating an object and executing the object as a method; and
   a plurality of registers for directing the execution of object methods according to a predetermined data structure design the plurality of registers including:
      an instruction register;
      a constant pool register:
      a frame register; and
      a class register.

2. An object-oriented processor according to claim 1, wherein the data structure logic of the execution unit is selected from among a group consisting of:
   trap emulation;
   a microcode sequence; and
   a hard-coded digital hardware logic.

3. An object-oriented processor according to claim 1, wherein:
   the data structure in the memory is a multiple-level data structure; and
   the execution unit includes a logic for deriving a plurality of pointers to the class structure for accessing a plurality of locations in the memory to index a plurality of locations in multiple-part instruction.

4. An object-oriented processor according to claim 1, wherein:
   an instruction set for the object-oriented processor is defined by a Java™ Virtual Machine specification.

5. An object-oriented processor according to claim 1, wherein:
   the memory further includes a constant pool storing condensed information of the class structure defining multiple-level memory accesses to index parts of a multiple-part instruction.

6. A method of implementing an object-oriented processor comprising:
   defining a data structure of an object-oriented operating environment;
   defining an object-oriented instruction set for executing in the object-oriented operating environment;
   directing the execution of object methods with a plurality of registers according to a predetermined data structure design, the plurality of registers including:
      an instruction register;
      a constant pool register;
      a frame register; and
      a class register; and
   generating a hardware implementation of the processor enforcing the logical relationships of the instruction set as defined by the data structure.

7. A method according to claim 6 wherein the hardware implementation generating operation is selected from among a group consisting of:
   trap emulation;
   a microcode sequence; and
   a hard-coded digital hardware logic.

8. A method according to claim 6 wherein the object-oriented instruction set is defined by a Java™ Virtual Machine specification.

9. A method according to claim 6 wherein the data structure includes a class structure and an object structure.

10. An object-oriented processor comprising:
    a data structure defining an object-oriented operating environment;
    a decoder for decoding an object-oriented instruction set for executing in the object-oriented operating environment; and
    a hardware logic enforcing logical relationships of the instruction set as defined by the data structure.

11. An object-oriented processor according to claim 10 wherein the hardware logic is selected from among a group consisting of:
    a trap emulation logic;
    a microcode sequence; and
    a hard-coded digital hardware logic.

12. An object-oriented processor according to claim 10 wherein the object-oriented instruction set is defined by a Java™ Virtual Machine specification.

13. An object-oriented processor according to claim 10 wherein the data structure is a memory including a class structure and an object structure.

14. An object-oriented processor comprising:
    a plurality of registers for directing the execution of object methods according to a predetermined data structure design, the plurality of registers including:
       an instruction register;
       a constant pool register;
       a frame register; and
       a class register;
    a memory including data structures that are defined for objects that are to be executed by the processor, the memory implementing an object-oriented instruction set in accordance with the data structures; and
    an execution unit for executing object methods according to the object-oriented instruction set implemented in the memory.

15. An object-oriented processor according to claim 14 wherein the data structure design includes:
    a constant pool including an entry having a pointer to a class structure;
    the class structure having a pointer to an object structure; and the object structure having a pointer to a method.

16. An object-oriented processor according to claim 14 wherein the hardware logic is selected from among a group consisting of:

a trap emulation logic;

a microcode sequence; and a hard-coded digital hardware logic.

17. An object-oriented processor according to claim 14 wherein the object-oriented instruction set is defined by a Java™ Virtual Machine specification.

18. An object-oriented processor according to claim 14 wherein the data structure is a memory including a class structure and an object structure.

* * * * *